W. SCHRADIN.
PIPE FITTING.
APPLICATION FILED FEB. 14, 1914.
1,186,236.
Patented June 6, 1916.
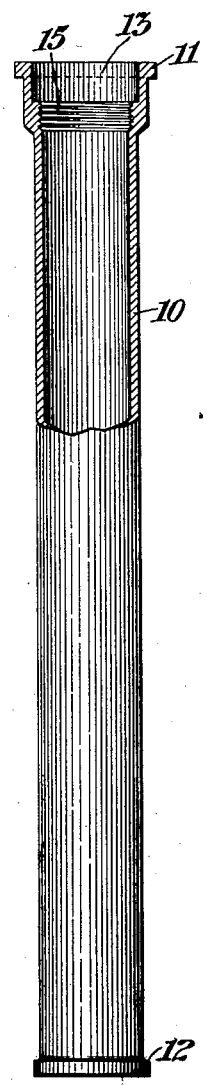
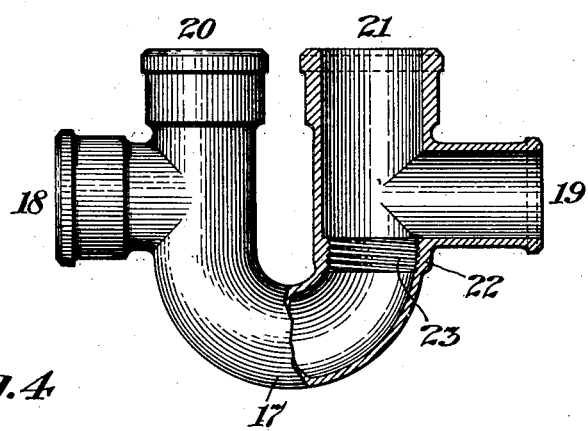
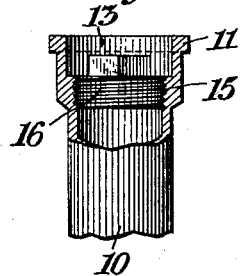
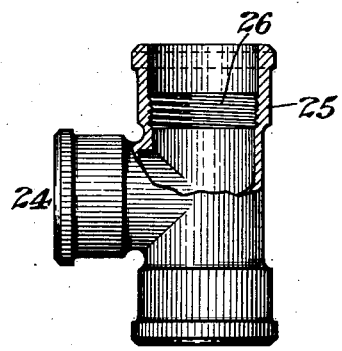
WITNESSES
Chas. F. Clagett
Bertha M. Allen.
INVENTOR
William Schradin
BY
HIS ATTORNEYS

UNITED STATES PATENT OFFICE.

WILLIAM SCHRADIN, OF NEW YORK, N. Y., ASSIGNOR OF ONE-THIRD TO SAID WILLIAM SCHRADIN, ONE-THIRD TO J. W. JOHNSON, OF NEW YORK, N. Y., AND ONE-THIRD TO TIMOTHY HOPKIN, OF YONKERS, NEW YORK.

PIPE-FITTING.

1,186,236.     Specification of Letters Patent.     Patented June 6, 1916.

Application filed February 14, 1914. Serial No. 818,634.

*To all whom it may concern:*

Be it known that I, WILLIAM SCHRADIN, a citizen of the United States, residing in the borough of Bronx, city, county, and State of New York, have invented an Improvement in Pipe-Fittings, of which the following is a specification.

My present invention relates to pipe fittings and particularly to waste or soil pipe fittings.

Heretofore in building construction, much difficulty has been experienced in testing pipe lines irrespective of whether the same were made of ordinary cast iron adapted to have calked joints, or whether made of wrought iron having screw threaded joints. This is due to the unreliability of the expansion plugs ordinarily used to stop the pipe line when making tests, inasmuch as these expansion plugs are likely to loosen and give way as they frequently do, thereby making the test a failure.

Now the object of my invention is to overcome this difficulty and provide a pipe fitting reinforced in a predetermined portion and tapped to receive an ordinary pipe plug which cannot break away, so that in the use of fittings made in accordance with my present invention, there is no liability of a test being a failure because of the plug becoming loose or breaking away.

In the drawing, Figure 1 is an elevation and partial longitudinal cross section illustrating a pipe fitting made in accordance with my present invention. Fig. 2 is a similar view illustrating my invention as applied to a U or trap fitting. Fig. 3 is also a similar view showing the invention applied to a tapping-in T fitting, and Fig. 4 is a view similar to Fig. 1, showing a plug in position in the pipe.

Referring to the drawings, and particularly to Fig. 1, 10 designates the body portion of a pipe fitting which, as in this illustration, may be an ordinary straight pipe provided at opposite ends with flanges 11 and 12, and at one end with an opening 13 of sufficiently larger diameter than that of the pipe, to receive the opposite end of the next adjacent pipe when the fittings are assembled. Adjacent one end of this straight pipe 10, the same is reinforced or enlarged or more metal is employed in the body thereof as indicated at 14, and this reinforced portion 14 is tapped so as to be provided with a standard screw thread 15, the tap being so made that the diameter thereof is substantially that of the inside diameter of the pipe. The tap portion of the pipe 15 is adapted to receive an ordinary pipe plug 16, as indicated in Fig. 4 when the pipe line has been constructed and is to be tested for leaks in its joints.

Referring to Fig. 2, the invention may be applied to a U or trap fitting wherein the bend or U portion of the pipe is indicated at 17, the inlet and outlet connections respectively at 18 and 19, while the hand holes extensions are indicated at 20, 21. In this form of the invention, the reinforced portion of the body of the pipe is preferably at one side of the inlet or outlet connections, and as indicated in the drawing, on the under side of the outlet connection 19. This reinforced portion is indicated at 22 and is tapped to be provided with a standard screw thread, as indicated at 23. The bore or diameter of the hand hole connection 21 in this form of fitting, is made sufficiently large to permit an ordinary standard pipe plug to be passed therethrough and turned down into the tapped portion 23 to securely shut off the pipe when making tests.

As indicated in Fig. 3, the invention may also be employed to a tapping-in T. This pipe is provided as is customary in such structures, with a hand hole 24 and at one end thereof the body portion is reinforced as indicated at 25, and the tap provided with a standard screw thread 26. In the use of this structure, as will be understood, the diameter of the hand hole 24 is sufficiently large to permit the pipe plug to be passed therethrough and turned down into the tapped portion 26 to completely and securely close the pipe line for testing purposes.

It will be further understood that while I have only shown and described three forms of pipe fittings, my invention is equally applicable to any and all forms of such fittings, and also to drainage fittings of cast, wrought or other metal, irrespective of whether the same are made of calked or screw thread joints.

I claim as my invention:

A pipe fitting comprising a main portion of uniform exterior and interior dimensions, and a joint portion of uniformly larger exterior dimensions than the exterior of said main portion, the inner end of said joint portion being screw threaded and of the same interior dimensions as said main portion, while the outer end of said joint portion is of uniformly larger interior dimensions than said main portion.

Signed by me this 26th day of January, 1914.

WILLIAM SCHRADIN.

Witnesses:
BERTHA M. ALLEN,
MARIE D. WOHLERS.